United States Patent
Wenger et al.

(10) Patent No.: US 9,483,161 B2
(45) Date of Patent: Nov. 1, 2016

(54) CONTROLLABLE DISPLAY OF A COLLABORATION FRAMEWORK SYSTEM

(71) Applicant: GroupSystems Corporation, Denver, CO (US)

(72) Inventors: Matt Wenger, Vittoriosa (MT); Travis R. Allison, Lakewood, CO (US); Justin K. MacLean, Englewood, CO (US)

(73) Assignee: GroupSystems Corporation, Denver, CO (US)

( * ) Notice: Subject to any disclaimer, the term of this patent is extended or adjusted under 35 U.S.C. 154(b) by 168 days.

(21) Appl. No.: 14/206,638

(22) Filed: Mar. 12, 2014

(65) Prior Publication Data

US 2014/0282108 A1    Sep. 18, 2014

Related U.S. Application Data

(60) Provisional application No. 61/787,164, filed on Mar. 15, 2013.

(51) Int. Cl.
*G06F 3/0482* (2013.01)
*H04L 29/06* (2006.01)

(52) U.S. Cl.
CPC ......... *G06F 3/0482* (2013.01); *H04L 65/1069* (2013.01); *H04L 65/1089* (2013.01); *H04L 65/1093* (2013.01); *H04L 65/4038* (2013.01)

(58) Field of Classification Search
CPC .............................. H04L 29/06; G06F 3/0484
See application file for complete search history.

(56) References Cited

U.S. PATENT DOCUMENTS

| | | | |
|---|---|---|---|
| 6,314,408 B1 | 11/2001 | Salas et al. | |
| 7,072,940 B1 * | 7/2006 | Day | G06Q 10/10 707/999.01 |
| 7,676,433 B1 * | 3/2010 | Ross | G06Q 20/02 705/37 |
| 2002/0085030 A1 * | 7/2002 | Ghani | G06Q 10/10 715/751 |
| 2005/0010589 A1 | 1/2005 | Novak et al. | |
| 2005/0120006 A1 * | 6/2005 | Nye | G06F 17/30705 |
| 2005/0216431 A1 * | 9/2005 | Baker | G06F 17/248 |
| 2006/0009992 A1 * | 1/2006 | Cwiek | G06Q 10/0635 705/325 |
| 2008/0244401 A1 * | 10/2008 | Bala | G06F 9/4446 715/708 |
| 2008/0250317 A1 * | 10/2008 | Evans | G06F 3/0481 715/712 |

(Continued)

OTHER PUBLICATIONS

U.S. Appl. No. 14/206,906, Wenger et al.

(Continued)

*Primary Examiner* — Steven Sax
*Assistant Examiner* — David Choi
(74) *Attorney, Agent, or Firm* — Sheridan Ross P.C.

(57) ABSTRACT

A structure of an interactive collaboration session is generated. The structure is typically based on an activity defined by a leader of the interactive collaboration session. The structure of the interactive collaboration session comprises different levels. For example, the structure of the interactive collaboration session may contain hierarchical levels that include top level items to discuss, a secondary level for responses to top level items, and a tertiary level for responses to the secondary level items. The structure of the interactive collaboration session is displayed to the leader. The leader controls the participants' display of the structure of the interactive collaboration as the interactive collaboration session progresses. For example, the leader may click on a button that disables the participants' ability to make comments during one part of the interactive collaboration session. Later, the leader can click on a button to enable the participants to make comments.

14 Claims, 13 Drawing Sheets

(56) References Cited

U.S. PATENT DOCUMENTS

| | | | |
|---|---|---|---|
| 2009/0217175 A1 | 8/2009 | Bechtel et al. | |
| 2010/0037151 A1* | 2/2010 | Ackerman | G06Q 10/10 715/753 |
| 2010/0191799 A1* | 7/2010 | Fiedorowicz | G06F 17/30873 709/203 |
| 2012/0179981 A1* | 7/2012 | Whalin | G06Q 10/10 715/753 |
| 2012/0226997 A1* | 9/2012 | Pang | H04L 65/4038 715/753 |
| 2012/0284606 A1 | 11/2012 | Sitrick et al. | |
| 2013/0080776 A1* | 3/2013 | Elduff | G06F 21/6218 713/168 |
| 2013/0111362 A1* | 5/2013 | Alexandrov | G06Q 10/10 715/753 |
| 2013/0211980 A1* | 8/2013 | Heiferman | G06Q 50/01 705/30 |
| 2013/0212494 A1* | 8/2013 | Heiferman | G06Q 10/1095 715/753 |
| 2013/0263020 A1* | 10/2013 | Heiferman | H04L 51/32 715/753 |
| 2014/0282108 A1* | 9/2014 | Wenger | G06F 3/0482 715/753 |

OTHER PUBLICATIONS

Search Report for European Patent Application No. 14160359.7, mailed Jun. 18, 2014, 4 pages.

Linnell "Why Doesn't Facebook Share Names of Everyone Who Likes Your Page?" Search Engine Watch, Apr. 3, 2012, 3 pages.

* cited by examiner

| ACTIVITY ABC ~310 | | | COMMENTS ~330 | | INSTRUCTIONS ~340 |
|---|---|---|---|---|---|
| CATEGORIES | IDEAS ~320 | | | | PLEASE PROVIDE COMMENTS ON SALLY |
| 1. SALES 2 (1) | MARKETING | | SHOULD WE HIRE SALLY? | | |
| 2. PUBLIC RELATIONS 5 (0) | 1. CHANGE LOGO | 0 (0) | 1. YES, SHE IS GOOD | | DOCUMENTS ~350 |
| 3. MARKETING 4 (0) | 2. SHOULD WE HIRE SALLY? | 2 (0) | 2. NO, SHE CANNOT DO X | | ADD   OTHER ▽ |
| | | | | | DOCUMENT A |
| CLICK HERE TO ADD CATEGORIES ~312 | CLICK HERE TO ADD IDEAS ~322 | | CLICK HERE TO ADD COMMENTS ~332 | | |

| ACTIVITY ABC 320 | |
|---|---|
| IDEAS | COMMENTS 330 |
| MARKETING | SHOULD WE HIRE SALLY? |
| 1. CHANGE LOGO  0 (0) | 1. YES, SHE IS GOOD |
| 2. SHOULD WE HIRE SALLY?  2 (0) | 2. NO, SHE CANNOT DO X |
| | CLICK HERE TO ADD COMMENTS 332 |

AGENDA

NEW ▽

ACTIVITY ABC — 202
ACTIVITY XYZ — 203

— 201

ROSTER — 204
● JOHN SMITH
● JACK HAMMER
● WILMA JONES
— 205

— 207

— 206 — 810A — 810B — 810C — 810N
| STEP 1 | STEP 2 | STEP 3 | STEP N |

— 800
— 801

ACTIVITY ABC (STEP 2 – REVIEW OF CATEGORIES)

| ● CATEGORIES — 210 | ● IDEAS — 211 — 220 | ● COMMENTS — 221 — 230 | ● INSTRUCTIONS — 231 — 240 — 241 |
|---|---|---|---|
| 1. SALES  2 (1) | MARKETING | SHOULD WE HIRE SALLY? | PLEASE PROVIDE COMMENTS ON SALLY |
| 2. PR  5 (0) | 1. CHANGE LOGO  0 (0) | 1. YES, SHE IS GOOD | |
| 3. MARKETING  4 (0) | 2. SHOULD WE HIRE SALLY?  2 (0) | 2. NO, SHE CANNOT DO X | |
| | | | ● DOCUMENTS — 250 — 251 |
| | | | ADD   OTHER ▽ |
| [CLICK HERE TO ADD CATEGORIES] — 212 | [CLICK HERE TO ADD IDEAS] — 213 — 222 | [CLICK HERE TO ADD COMMENTS] — 223 — 232 | DOCUMENT A — 233 |

FIG. 8

ACTIVITY ABC ⎯ 300

⎯ 310

| CATEGORIES | | IDEAS ⎯ 320 | | COMMENTS ⎯ 330 |
|---|---|---|---|---|
| 1. SALES | 2 (1) | MARKETING | | SHOULD WE HIRE SALLY? |
| 2. PUBLIC RELATIONS | 5 (0) | 1. CHANGE LOGO | 0 (0) | 1. YES, SHE IS GOOD |
| 3. MARKETING | 4 (0) | 2. SHOULD WE HIRE SALLY? | 2 (0) | 2. NO, SHE CANNOT DO X |
| ⎯ 312 | | ⎯ 322 | | ⎯ 332 |
| CLICK HERE TO ADD CATEGORIES | | CLICK HERE TO ADD IDEAS | | CLICK HERE TO ADD COMMENTS |

CONTROLLABLE DISPLAY OF A COLLABORATION FRAMEWORK SYSTEM

CROSS REFERENCE TO RELATED APPLICATIONS

This application claims the benefit under 35 U.S.C. §119 (e) of U.S. Provisional Application No. 61/787,164, filed Mar. 15, 2013, entitled "CONTROLLABLE DISPLAY OF A COLLABORATION FRAMEWORK SYSTEM," the entire disclosure of which is incorporated herein by reference.

TECHNICAL FIELD

The systems and methods that relate to collaboration systems and in particular to collaboration frameworks.

BACKGROUND

With the advent of interactive collaboration technologies, such as web conferencing, the ability for participants to collaborate has increased dramatically. However, the ability to control the flow and discussion of an interactive collaboration session has not kept up with these technologies. Some existing systems do allow a leader to provide an agenda for an interactive collaboration session. The leader can then go through the agenda in the collaboration session. One problem with these types of systems is that they do not allow the leader to easily control what information is presented to participants and what structure of input can be given by participants of the collaboration session as the collaboration session progresses. What is needed is a system that overcomes the deficiencies of existing systems.

SUMMARY

Systems and methods are provided to solve these and other problems and disadvantages of the prior art. A structure of an interactive collaboration session is generated. The structure is typically based on an activity or agenda defined by a leader of the interactive collaboration session. The structure of the interactive collaboration session comprises different levels. For example, the structure of the interactive collaboration session may contain levels that include a category, or question to be discussed along with ideas or answers and comments associated with the category or question. The structure of the interactive collaboration session is displayed to the leader of the interactive collaboration session. The leader controls how a display of the structure of the interactive collaboration session is displayed to participants as the interactive collaboration session progresses through the activity. For example, the leader may click on a button that does not allow participants to make comments during one part of the interactive collaboration session. Later on, the leader can click on a button to allow the participants to make comments. This allows the leader to better manage the interactive collaboration session because the leader has more control of the flow of the interactive collaboration session.

In one embodiment, the leader can define a template that is used to generate one or more steps in the interactive collaboration session. The steps allow the leader to easily step through an activity and easily control how the participants can interact in the interactive collaboration session.

BRIEF DESCRIPTION OF THE DRAWINGS

FIG. 3 is a diagram of first view of a participant window of a controlled view in a collaboration framework.

FIG. 4 is a second diagram of a second view of a leader window for controlling a collaboration framework.

FIG. 5 is a diagram of a second view of a participant window of a controlled view in a collaboration framework.

FIG. 8 is a first diagram of a first view of a leader window for controlling a collaboration framework that includes a stepped activity framework.

FIG. 11 is a diagram of a second view of a participant window of a controlled view in a collaboration framework that uses a stepped activity framework.

DETAILED DESCRIPTION

Figure 1:
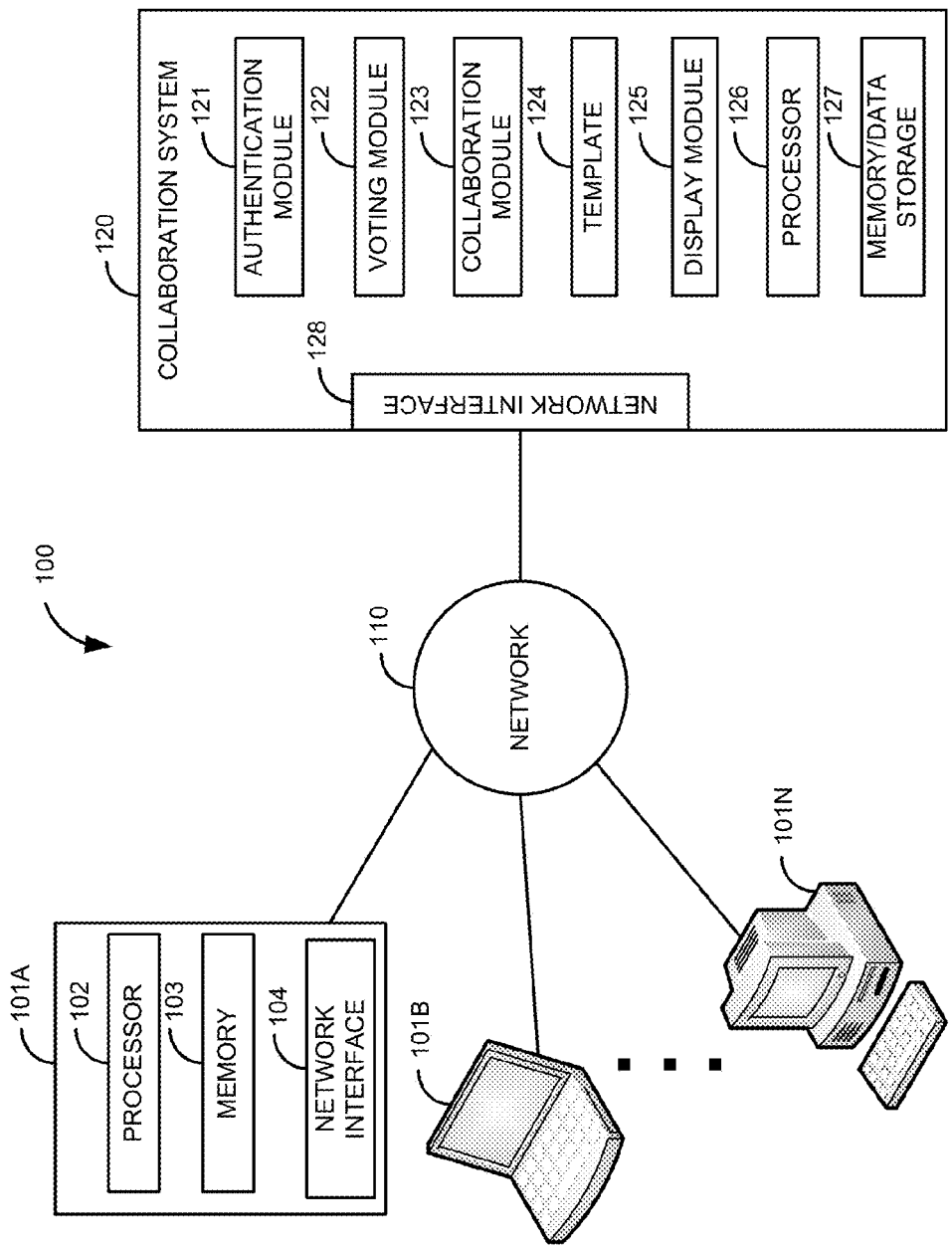
FIG. 1 is a block diagram of a first illustrative system for controlling a display of a collaboration framework.

FIG. 1 is a block diagram of a first illustrative system 100 for controlling a display of a collaboration framework. The first illustrative system comprises communication devices 101A-101N, a network 110, and a collaboration system 120.

The communication devices 101A-101N may be any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101. In addition, the communication device 101 may be directly connected to the collaboration system 120.

The communication device 101 comprises a processor 102, a memory 103, and a network interface 104. The processor 102 can be any type of processor 102, such as a microprocessor, a multi-core processor, a Digital Signaling Processor (DSP), a microcontroller, and/or the like. The memory 103 can be any type of memory, such as a Random Access Memory, a Flash Memory, a hard disk, and/or the like. The network interface 104 can be any type of interface, such as a wireless interface, a wired interface, a cellular interface, an Ethernet interface, and/or the like. The network interface 104 is used to communicate with the network 110.

The communication device 101 generally includes participant output devices, such as a display, a speaker, a vibrator, and the like. The communication device 101 can include participant input devices such as a keyboard, a keypad, a touch screen, a mouse, a pointing device, and/or the like. The processor 102 and the memory 103 can be used to execute programs. For example, the processor 102 and the memory 103 can be used to execute a web browser or other applications that work in conjunction with the collaboration system 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The collaboration system 120 can be any hardware/software that can communicate on the network 110, such as a collaboration server, a multimedia server, a server, a web server, a web conferencing system, a communication system, a combination of these, and the like. For example, the collaboration system 120 can include a server that incorporates the memory/data storage 127. The memory/data storage contains programming/computer instructions for implementing various modules or functions. The collaboration system 120 includes a processor 126 for executing the programming/computer instructions in the memory/data storage 127. The modules or function can communicate information via the network interface 128 to the communication devices 101A-101N.

The collaboration system 120 further comprises an authentication module 121, a voting module 122, a collaboration module 123, a template 124, and a display module 125. The authentication module 121 can be any hardware/software that can authenticate a participant, such as, a private key authentication system, a digital certificate system, a password verification system, and/or the like. The authentication module 121 can use one or more encryption technologies such as Data Encryption Standard (DES), Public Key Encryption (PKI), Secure Socket Layer (SSL), Diffie Hellman, Advanced Encryption Standard (AES), and/or the like. The authentication module 121 is used to authenticate participants into the collaboration system 120.

The voting module 122 can be any hardware/software that can process votes from collaborating participants. The voting module 122 works in conjunction with the collaboration module 123 to process votes of collaborating participants.

The collaboration module 123 can be any hardware/software that allows participants at the communication devices 101A-101N to collaborate with one another. The collaboration module 123 works in conjunction with the authentication module 121 and voting module 122. The collaboration module 123 is designed to facilitate different types of collaborations between participants.

The display module 125 can be any hardware/software that can generate a display of the interactive collaboration session and/or can generate information for display in the interactive collaboration session. For example, the display module 125 can be a web server, a video card, a browser, and the like. The display module 125 is shown as being part of the collaboration system 120. However, in some embodiments, the display module 125 may in the communication devices 101A-101N and/or the collaboration system 120.

An interactive collaboration session typically occurs between a leader and a set of participants. The leader and the participants join the interactive collaboration session using the communication devices 101A-101N. The leader of an interactive collaboration session is typically defined by a system administrator. The leader of the interactive collaboration session is typically a designated person that facilitates the flow of the interactive collaboration session. An interactive collaboration session can be any type of group activity where two or more people collaborate. For example an interactive collaboration session can be a brainstorming session, a discussion of one or more topics, a group meeting, a regularly scheduled meeting, and/or the like. In addition to leaders, there may be one or more defined co-leaders. The co-leader(s) may have all the same permissions as the leader or only a sub-set of permissions. For example, the co-leader may have all the permissions of the leader with the exception of setting default permissions for participants.

The leader, for example, at the communication device 101A, logs in to communication system 120 via the authentication module 121. The leader generates a collaboration activity using the collaboration module 123. The collaboration activity (e.g., an agenda) is used to define the interactive collaboration session. For example, an activity of the interactive collaboration session can be a series of items that will be discussed during the interactive collaboration session. During this process, the leader defines a set of participants that will collaborate on the collaboration activity. The leader, via the collaboration module 123, generates a structure of the interactive collaboration session.

The structure of an interactive collaboration session can be any structure defined by the leader or defined in the template 124. For example, a hierarchical structure in a collaboration activity can comprise categories, ideas associated with each category, and comments associated each idea that are viewed in levels (See FIG. 2 as an illustrative example). In other embodiments, the names of the structure of the interactive collaboration session can be different. The leader can also define the structure of the interactive collaboration session by using a structure wizard (not shown) that allows the leader to define the structure. The structure of the interactive collaboration session is displayed by the display module 125 to the leader (See FIG. 2 as an example).

Once the collaboration activity is defined. Participants at the communication devices 101B-101N authenticate to the collaboration system 120 via authentication module 121. The participants select the collaboration activity they are going to join. The participants who have joined the collaboration activity are then displayed in a participant window for the selected activity (See FIGS. 3 and 5 as examples of participant windows 300) by the display module 125. The view presented to the participants in a participant window 300 is typically different than the view presented to the leader in a leader window 200.

The leader can control which levels of the structure of the interactive collaboration session are displayed by the display module 125 to the participants. This can be accomplished via input from the leader, such as clicking on a button, selecting a menu, via a voice command, via a gesture, and/or the like. This way the leader can select individual levels/groupings/items, multiple levels/groupings/items, or all the levels/groupings/items in the structure of the interactive collaboration session to display by the display module 125 to the participants. These types of input can also be used to control other aspects/levels of the invention, such as agendas, rosters, instructions, documents, and/or the like. The collaboration module 123 uses the input from the leader to control the interactive collaboration session.

In another embodiment, the leader can divide the structure of the interactive collaboration process into two or more structures. For example, if the leader wants to break an existing interactive collaboration session into two different groups, one to discuss the current activity and a new group to discuss a new activity, the leader can add/create a new collaboration activity and take a subset of the participants in the existing activity and place them in the new activity. For example, if the current collaboration activity is Activity A with participants H, I, J, and K. The leader can divide the current activity into two activities (Activity A-1 and Activity A-2) and move the participants J and K into the Activity A-2. The leader can moderate the two sessions by toggling back and forth between the two activities. This can be done in a similar manner as done with separate activities (See FIG. 2, items 202 and 203). Once the activities are divided, the participants of the two activities, based on a setting of the leader, may or may not be able to view the interactive collaboration session of the other activity. In another embodiment, the leader may be able to divide the activity into two or more activities where all the participants (or only specific ones) may be able to toggle back and forth between the two activities in a similar manner as the leader.

Once the interactive collaboration session for the two activities is complete, the leader can then merge the two activities back into a single activity. This can be accomplished by merging the corresponding categories of one activity with the categories of the other activity. Categories that came from Activity A-1 could have a flag that identifies that the categories came from the divided Activity A-1. Likewise, categories that came from Activity A-2 can be identified in a similar manner. The corresponding structure for the ideas associated with the categories and the comments associated with the ideas will be merged in a similar manner. This way all the categories, ideas, and comments will be available to the leader in the merged activity.

In another embodiment, the leader can propose a vote using the voting module 122 on a specific ballot item. The leader can have control over how the participants view the voting results based on clicking a button, menu, voice input, and/or the like. Individual ballot items on the vote can be controlled using Ballot Item Controls (Not pictured). The display of individual vote criteria can also be controlled using Vote Criteria displays (Not Pictured).

Figure 7:
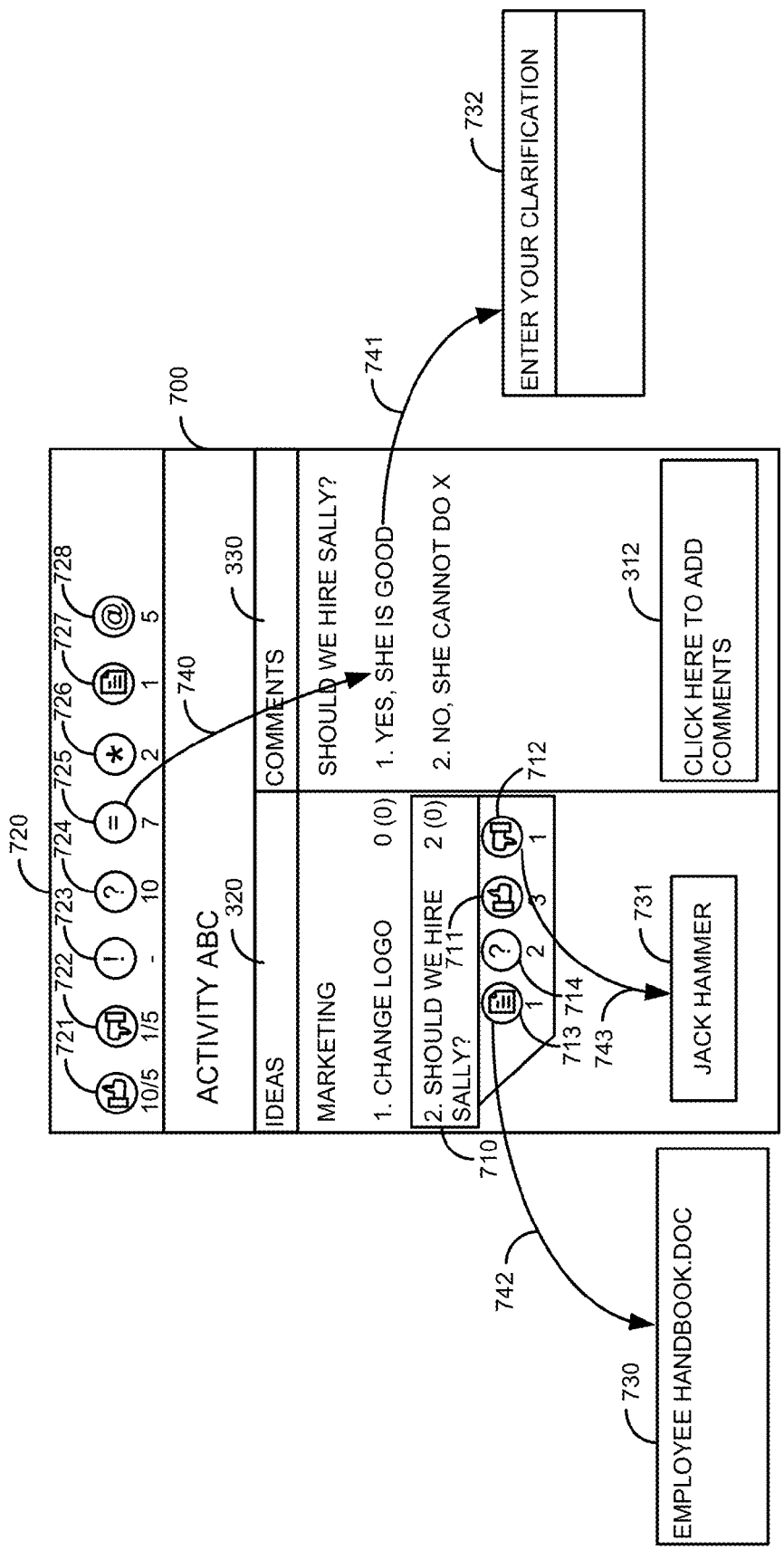
FIG. 7 is a diagram of a view of a participant window that contains a context frame for managing contributions to an interactive collaboration session.

In another embodiment, the collaboration module 123 can identify items (e.g., categories, ideas, comments, etc.) for the interactive collaboration session. The collaboration module 123 receives an input to tag an individual item in the interactive collaboration session (e.g., as shown in FIG. 7). For example, a participant can tag a comment that the participant likes the comment. The collaboration module 123 associates context information with the tagged item. For example, the like is associated with the tagged item. Another participant or the same participant can associate a context frame with the individual item of the plurality of items (as shown in FIG. 7, element 710). The display module 125 can generate information to display the associated context information to the participant. For example, the display module 125 can generate information to display the context information to the participant by sending a web page to the communication device 101.

Illustratively, the communication devices 101, the collaboration system 120, the authentication module 121, the voting module 122 and the collaboration module 123 are stored-program-controlled entities, such as a computer or processor, which performs the processes described herein by executing program instructions stored in a tangible computer readable storage medium, such as a memory or disk.

Figure 2:
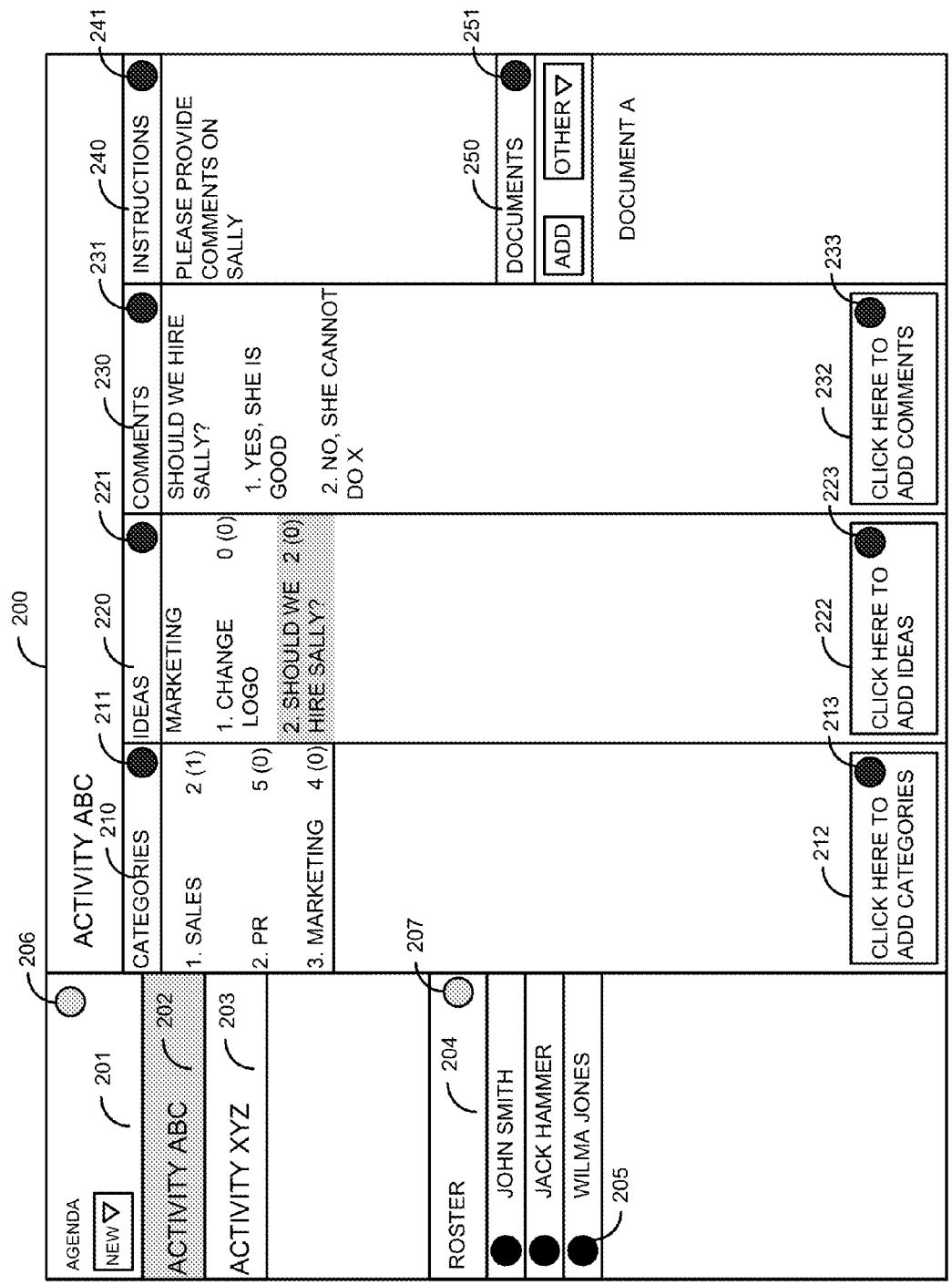
FIG. 2 is a diagram of a first view of a leader window for controlling a collaboration framework.

FIG. 2 is a diagram of a first view of a leader window 200 for controlling a collaboration framework. In accordance with embodiments of the present disclosure, the leader window 200 is presented by communication device 101 of the leader. In addition, the leader window 200 can include various selectable buttons, menus, text boxes or other inputs that allow the leader to control the collaboration framework. The leader window 200 comprises an activity menu 201, collaboration activities 202-203, a roster 204, participant status buttons 205, an activity control button, 206, a participant control button 207, a leader category column 210, a category control button 211, an add category box 212, an add categories control button 213, a leader idea column 220, an ideas control button 221, an add idea box 222, an add idea control button 223, a leader comment column 230, a comment control button 231, an add comment box 232, an add comment control button 233, a leader instructions area 240, a view instructions control button 241, a leader documents area 250, and a view documents control button 251.

The leader window 200 is the main window that the leader uses to control structure and levels of the interactive collaboration session. The leader can create a new collaboration activity by selecting the activity menu 201 to add a new activity. In this example, the leader has created two activities: 1) Activity ABC 202, and 2) Activity XYZ 203. The Activity ABC 202 is the current activity being displayed in leader window 200 (indicated by the grey background). If the leader selected the Activity XYZ 203, the leader window 200 would display the structure of the interactive collaboration session for the Activity XYZ 203, which can have a completely different structure The activity menu 201 also includes the activity control button 206. The activity control button 206, in this example, is a toggle button that allows the leader to control whether the participants can view activity items. In this example, the activity control button 206 has been toggled to grey. When toggled to grey, the participants will unable to see the activity items (202 and 203). If toggled to green (green is represented by black in all attached black and white drawings), the participants will see the activity items 202 and 203.

The roster 204 shows which participants of the interactive collaboration session are currently logged in and involved in the interactive collaboration session for the Activity ABC 202. In this example, three participants are currently involved in the interactive collaboration session for the Activity ABC 202 (indicated by the green color (black in the drawing) of the user status button 205 for each user). A user can be either be a participant or a leader. The Leader may also control if a person is part of an interactive collaboration session by clicking on the user status button 205 of each user. This would result in the user status button 205 changing color (e.g., from green to red). The participant status button 205 may also convey that a participant has been defined as part of the interactive collaboration session, but is currently not logged into the interactive collaboration session. The view that is presented to the leader can show one color for logged in and collaborating (e.g., green), one color for not logged in (e.g., grey), and another color for logged in, but where the leader has taken the participant out of the interactive collaboration session (e.g., red). The ability to take a participant in and out of the interactive collaboration session is useful based on the specific topic being discussed.

The leader can also control if all the participants can view the other participants in the interactive collaboration session by clicking the participant control button 207. The participant control button 207 if toggled to grey disables all participants from viewing the other participants in the interactive collaboration session.

The structure of the interactive collaboration session for the Activity ABC 202, comprises three levels. The names given to these levels can be customized by the session leader to match the structure of collaboration that they intend to guide participants through. Levels may be named anything the leader wishes, such as Questions/Responses/Comments or Categories/Risks/Root causes. In the example shown in 202, the levels are named: 1) categories, 2) ideas, and 3) comments. In this example, there are three levels; however, in other embodiments, there can be more or less than three levels. The leader instructions area 240 and leader documents area 250 can also be considered levels. The structure of the interactive collaboration session for the Activity ABC 202 is shown in the leader category column 210, the leader ideas column 220, and the leader comment column 230. The leader category column 210 shows three categories for the activity ABC 202. The categories, in this embodiment, are like an activity of the interactive collaboration session. In other alternatives, the categories can be used for a variety of purposes. For example, items in the category column 210 can be an idea, an event, an action, a concept, a question, a combination of these, and the like.

In this example, the categories 210 are: 1) Sales, 2) Public Relations, and 3) Marketing. The number next to the categories indicates the total number items below that level. For example, Marketing shows a 4 (0) in the leader categories column 210. The 4 indicates that there are 4 total items in marketing (2 in ideas, and 2 in comments). The 0 indicates that all the items have been viewed by the leader. The Sales item in the leader category column 210 show a 2 (1). This indicates that there are two items below this item and that there is one item that has not been viewed by the leader.

In this example, the structure (i.e., the ideas and comments associated with a category) that is shown is a structure for Marketing (identified by the line under Marketing in the leader categories column 210). Marketing, as shown in the leader ideas column 220, has two ideas: 1) whether to change their logo, and 2) should we hire Sally? The "should we hire Sally" item has been selected (indicated by the grey background), which results in the two comments that were added (in the leader comments column 230) being displayed, one that indicates that yes, she is good and a second one that indicates no, she cannot do X. The text items in each of the levels are defined as a contribution. A contribution can come from a leader, a co-leader, or a participant.

Each of the levels of the interactive collaboration session has a button (211, 221, and 231), that allows the leader to control the view of participants. The category control button 211 allows the leader to control if the participants can view or not view the contributions in the leader categories column 210 in the participant window 300 (see FIGS. 3 and 5). The ideas control button 221 allows the leader to control if the participants can view or not view the contributions in the leader ideas column 220 in the participant window 300. The comment control button 231 allows the leader to control if the participants can view or not view the contributions in the leader comment column 230 in the participant window 300.

Each of the buttons 211, 221, and 231, in this embodiment, is a toggle button that changes color. For example, the button (211, 221, and 231) is green (black in the drawing) when the participants can view the respective column. The button (211, 221, and 231) is grey when the participant cannot view the respective column. In another embodiment, one or more of the buttons (211, 221, and 231) may be a three way toggle button that displays three colors (e.g., green, yellow, and black). When toggled to green, the participants can view the respective column. When toggled to grey, none of the participants can view the respective column. When toggled to yellow, an individual participant can only view a contribution that he/she input. For example, if John Smith had input the comment "No, she cannot do X," the participants Jack Hammer and Wilma Jones in the same interactive collaboration session would not be able to view John Smith's comment (although the leader and participant John Smith would be able to view it).

Each of the columns 210, 220, and 230 (levels) contains a text box (212, 222, and 232) that allows the leader to add an item to each level in the structure. The leader, via the add category box 212 can add a new category to the leader category column 210. The leader, via the add idea box 222 can add a new idea to the leader ideas column 220. The leader, via the add comments box 232 can add a new comment to the leader comments column 230.

The leader can also control whether the participants can add items (contributions) to each of the levels of the structure of the interactive collaboration session. The leader can select the add categories control button 213 to allow or not allow a participant to add a new item to a participant category column (See FIG. 3). The leader can select the add idea control button 223 to allow or not allow a participant to add a new idea to the participant idea column. The leader can select the add comment control button 233 to allow or not allow a participant to add a new idea to the participant comment column. A contribution that is provided by a participant is typically anonymous. However, in some embodiments, the contribution provided by the participant will be marked with an identifier indicating the participant who made the contribution. In one embodiment, this is only known the leader. In other embodiments, it may be known by the other participants.

The leader can also control if the participants can view instructions in the leader instructions area 240. In some embodiments this area will be represented as a tab in the interface. This is accomplished by the leader selecting the view instructions control button 241. Likewise, the leader can control if participants can view and add documents to the leader documents area 250. In some embodiments, this area will be represented as a tab in the interface. The leader can toggle the view documents control button 251 to control if participant can view and add and/or delete documents. Although not shown, control of viewing documents may be separate from control of adding and/or deleting documents. In FIG. 2, both the view instructions control button 241 and the view documents control button 251 have been toggled to green (black in the drawing), indicating that the participants will be able to view instructions and documents along with adding and deleting documents.

In other embodiments, the leader via a control button (not shown) may control if a participant can modify another participant's contribution. In another embodiment, the leader may control (enable or disable) if a participant can navigate the structure of the interactive collaboration session.

The leader window 200 is an example of a hierarchical structure of an interactive collaboration. However, in alternative embodiments, the structure of the interactive collaboration session may be based on different structures, such as based on tabs. The tabs may be used to define the structure of the interactive collaboration session. For example, instead of columns, there would be a tab for the different items, such as a tab for the categories, a tab for the ideas, and a tab for the comments (or tabs for different/additional groupings). A control button may be displayed on each of the tabs to allow the leader to enable/disable a tab from being viewed by the participants of the interactive collaboration session.

In another embodiment, a grid can be used to define the structure of the interactive collaboration session. A control button is placed on a row(s) and/or column(s). This allows the leader to enable/disable what rows/columns can be view by the participants of the interactive collaboration session.

In a different embodiment, items of a menu can be used to define the structure of the interactive collaboration session. A control button is placed on menus and/or menu items. This allows the leader to enable/disable what menus/menu items can be viewed by the participants of the interactive collaboration session.

In one embodiment the color of the buttons 205, 206, 207, 211, 221, 231, 241, 251, 213, 223, and 233 is green when the participants can view the contributions/items/information and is grey when the participants cannot view the contributions/items/information.

FIG. 3 is a diagram of a first view of a participant window 300 of a controlled view in a collaboration framework. In this exemplary view, the participant window 300 comprises a participant categories column 310, a participant ideas column 320, a participant comments column 330, a participant instruction area 340 and a participant documents area 350. The participant window 300 also comprises a participant add categories box 312, a participant add ideas box 322, and a participant add comments box 332. The participant window 300 is the corresponding participant window 300 that is displayed to the participants based on the current settings of leader window 200 as shown in FIG. 2.

In the leader window 200, the activity control button 206 and the participant control button 207 in FIG. 2 have been toggled to grey. Thus, the Activity ABC 202 and the Activity XYZ 203 in the activity menu 201, along with the roster 204 are not displayed in the participant window 300.

In the leader window 200, the category control button 211, the ideas control button 221, and the comment control button 231 have been toggled to green (black in the drawing) to allow the participants to view each of the columns (210, 220, and 230). These selections result in the leader categories column 210, the leader idea column 220, and the leader comment column 220 of the leader window 200 being displayed respectively in the participant categories column 310, the participant idea column 320, and the participant comment column 330 of the participant window 300.

In addition, in the leader window 200, the add categories control button 213, the add idea control button 223, and the add comment control button 233 have been toggled green (black in the drawing) to allow the participants to enter items into the respective columns (310, 320, and 330). This allows the participants (in addition to the leader) to add new items (contributions) to be displayed in both the category columns (210 and 310), the idea columns (220 and 320), and the comment columns (230 and 330).

In the leader window 200, the view instructions control button 241 is toggled to green (black in the drawing; to indicate that the participants can view this field). This results in the leader instructions area 240 being displayed the participant window 300. Likewise, the view documents control button 251 is toggled to green (black in the drawing). This results in the leader documents area 250 being displayed in the participant window 300.

Figure 4:
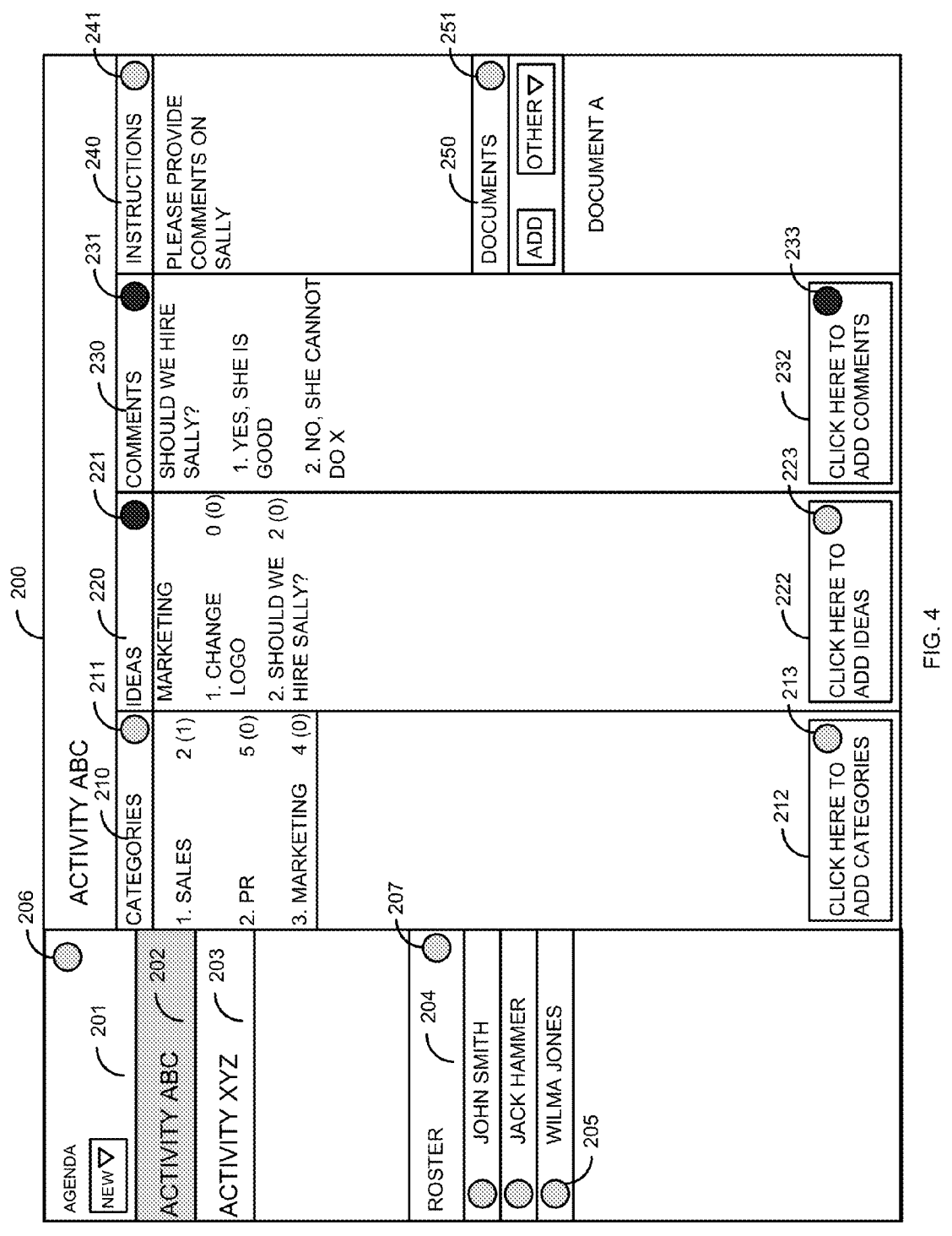

FIG. 4 is a diagram of a second view of a leader window 200 for controlling a collaboration framework. The difference between FIG. 4 and FIG. 2 is that the category control button 211 has been toggled grey by the leader to indicate that the participants cannot view the information in the participant category column 310. In addition, the add idea control button 223 has been toggled to grey to indicate that the participants cannot add any new ideas to the ideas columns 320. The instructions control button 241 and the documents control button 251 button have also been toggled to grey to indicate that the participants cannot view the information in the respective areas 340 and 350.

FIG. 5 is a diagram of a second view of a participant window 300 of a controlled view in a collaboration framework. Based on the category control button 211 being toggled (to grey) as shown in FIG. 4, the categories column 310 is no longer displayed in the participant window 300 shown in FIG. 5. Likewise, based on the add idea control button 223 being toggled (to grey) as shown in FIG. 4, the participant add ideas box 322 is no longer displayed in participant window 300 as shown in FIG. 5. Based on the instructions control button 241 and the documents control button 251 being toggled, the participant window 300 no longer shows the participant instruction area 340 and the participant documents area 350 are no longer displayed.

Since the leader can select various combinations of the category control button 211, the ideas control button 221, the comment control button 231, the instructions control button 241, and the documents control button 251, the leader can easily control which levels of the structure of the interactive collaboration session are displayed to the participants.

Figure 6:
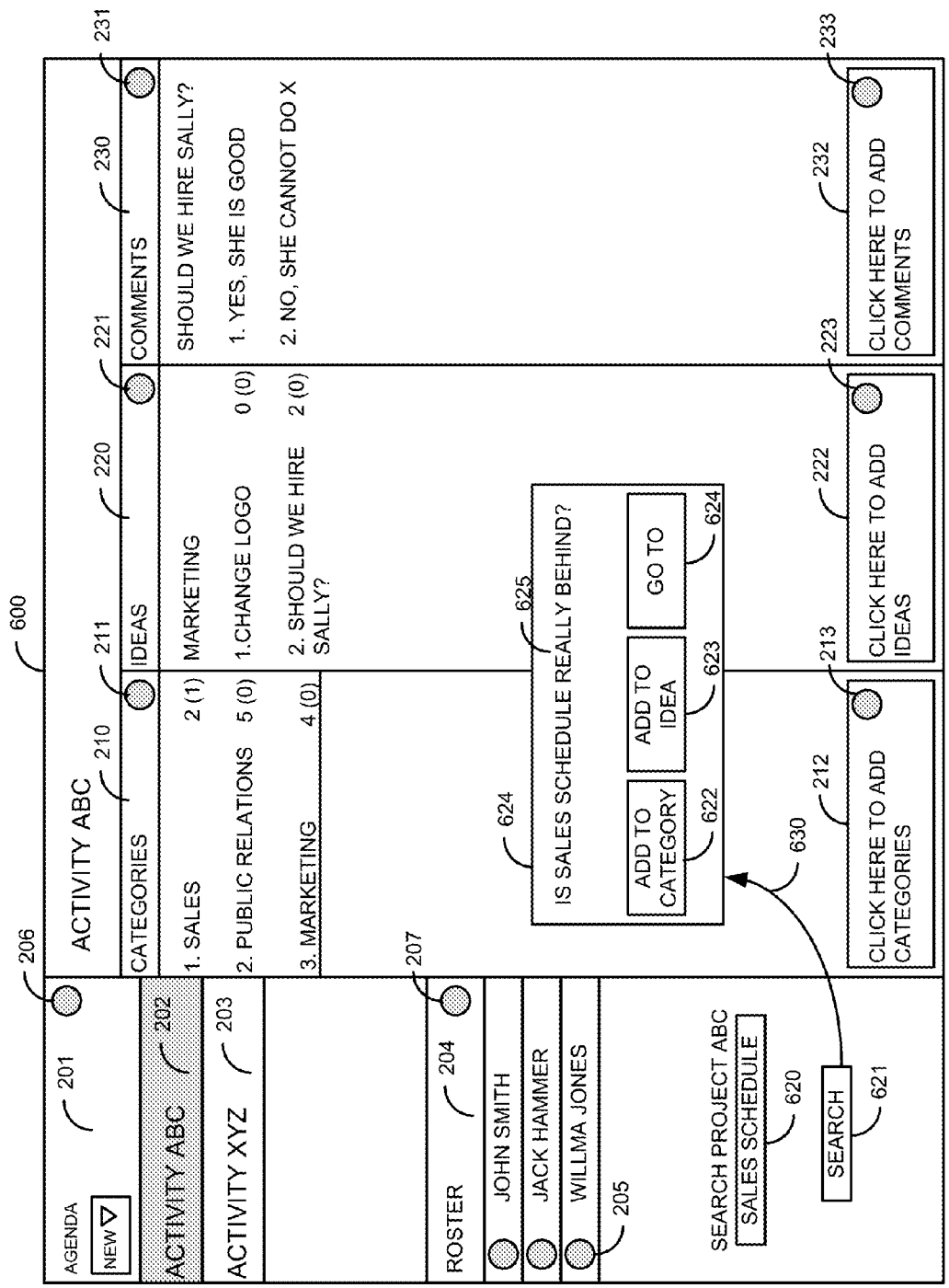
FIG. 6 is a diagram of a leader window for viewing context in collaboration framework.

FIG. 6 is a diagram of a leader window 600 for viewing contributions in a collaboration framework. Although primarily used by a leader, the leader windows 200 and 600 can be used by anyone who has been give the necessary permissions, such as a co-leader or manager. The leader window 600 comprises the same items of leader window 200 (excluding the items 240, 241, 250 and 251).

The leader window 600 also comprises a search box 620, a search button 621, a search window 624. The search window 624 further comprises an add to category button 622, an add to idea button 623, and a search result 625. The search box 620 allows the leader to enter a keyword(s) in order to search the structure of one or more activities 202-203. For example, as shown in search box 620, the leader wants to search for the key word "Sales Schedule." After entering the keyword(s), the leader selects the search button 621. This brings up the search window 624. In this example, there was one contribution that was found in searching the Activity ABC 202. The contribution was the statement "Is Sales Schedule really behind?" that is displayed in search result 625. In this example, the contribution "Is sales schedule really behind?" is not shown in the structure because it is a comment off of the sales activity in Activity ABC. The leader can select the search result 625 and then select the add to category button 622 to add the selected contribution to the leader category column 210. In a similar manner, the participant can select the add to idea button 623 and add the selected search result 625 to the currently displayed leader idea column 220. The leader can also select the go to button 624 to bring up the structure for the "Is sales schedule really behind?" contribution.

FIG. 7 is a diagram of a view of a participant window 700 that contains a context frame 710 for managing context information. FIG. 7 comprises participant window 700, tag tray 720, document display window 730, dislike display window 731, and clarification enter window 732. The participant window 700 comprises the participant ideas column 320, the participant comments column 330, and the participant add categories box 312. The participant window 700 also comprises the context frame 710. The context frame 710 is described below from a participant view in the participant window 700. However, the context frame 710 can work in the same manner for the leader window 200.

In this example, the context frame 710 is shown as being over the idea "Should we hire Sally." The context frame 710 works in conjunction with the tag tray 720 for associating context information with items (e.g., ideas or comments) of the participant window 700. The context frame 710 further comprises a like tag button 711, a dislike tag button 712, a documents tag button 713, and an add question tag button 714. Although not shown, the context frame 710 can comprise a variety of buttons, such as an important tag button (to flag an item as important), a clarification tag button (where a participant can clarify an item), a comment tag button, and a contact button (where a participant can add a contact to an item), a favorites tag button, a monitory value tag button (where a participant can associate a monetary number with an item), a summary tag button (by default is not visible to participants), presentation tag button, a photo tag button, a link tag button (e.g., a link to a web site), a custom tag button and/or the like. The context frame 710 can also comprise copy, cut, paste, delete, indent, out dent, and reorder buttons. The leader may control which buttons each participant sees in the context frame 710. For example, one participant may see different buttons than another participant, or participants may see a different set of buttons in each of the activities in a session.

Below each of the tag buttons 711-714 is a number. The number indicates an amount associated with the tag button 711-714 for the particular item that the context frame 710 is over. For example, the like tag button 711 has 3 likes associated with the idea "Should we hire Sally." The dislike tag button 712 has one dislike associated with the idea "Should we hire Sally." The documents tag button 713 has one document associated with the idea "Should we hire Sally." The add question tag button 714 has two questions associated with the idea "Should we hire Sally." In some embodiments, these numbers may not be displayed, and instead, the tag button 711 will appear on the context frame where it has been applied at least once, and not be displayed if it has not been applied to the information by any user.

The tag tray 720 comprises a variety of icons for tagging different types of context information to items in the participant window 700. The tag tray 720 comprises a like icon 721, a dislike icon 722, an importance icon 723, a question icon 724, a clarification icon 725, a comment icon 726, a document icon 727, and a contact icon 728. The tag tray 720 can also include other icons for associating different types of context information, such as a favorites icon, a monetary value icon, a summary icon, a presentation icon (for holding a link to a presentation), a photo icon, a link icon (e.g., a link to a web page), a custom icon, and/or the like. The icons that a participant sees in the participant tag tray 720 can be controlled by the leader or can be an administered.

Each of the icons 721-728 in the tag tray 720 may have a limit number associated with the icon. In this example, icons 721-722 and 724-728 have a limit number below the respective icon 721-722 and 724-728. The like icon 721 has the limit No. 10/5 below the like icon 721. The 10 represents the maximum number of likes that the participant can use for the activity (Activity ABC). In this example, the participant has used five likes out of the allowed ten likes. The importance icon 723 has a dash below the importance icon 723. The dash indicates that there is no limit for the importance icon. If an icon only has a single number below the icon, this indicates the maximum limit, but that the participant has not used any of the maximum limit. For example, the comment icon 724 shows that this particular participant has a limit of 10 comments, but the participant in this case has not used any of the 10 available comments for the activity ABC.

To associate context information with an item (contribution), the participant can select an icon 721-728 and drag the icon onto an item to select the item. For example, the participant could select the clarification icon 725 and drag the clarification icon 725 (as shown in step 740) onto the item "Yes, she is good." This results in the clarification enter window 732 being displayed so that the participant can enter a clarification of the comment "Yes, she is good." The process of selecting an item by dragging an icon onto an item can be done for any of the icons 721-728. For example, the participant can drag the dislike icon 722 onto the item "Yes, she is good" item.

As the participants of the interactive collaboration session associate various types of context information with an item (e.g., the clarification just described), this information can then be displayed during the interactive collaboration session via the context frame 710. For example, as a participant drags the like icon 721 onto an item, the other participants in the interactive collaboration session will see the added like for the item by moving the context frame over the item. In this example, if another participant dragged the like icon 721 onto the "Should we hire Sally" item, the participant of participant window 700 would see the number under the like tag item 711 change from 3 to 4 in the context frame 710.

Via the context frame 710, participants and the leader can see details of the context information associated with the each of the tag buttons 711-714 in the context frame 710. For example, if the participant or the leader selects the documents tag button 713, this results in the documents display window 730 being displayed to the participant or leader in step 742. The documents display window 730 shows the document that is associated with the item "Should we hire Sally," which is the employee handbook.doc. The participant can then select the employee handbook.doc to open this document.

If the participant wanted to see who did not like the item "Should we hire Sally," the participant or leader can click on the dislike tag button 712. The dislike display window 731 is then displayed in step 743 to the participant or leader that indicates, in this example, that Jack Hammer did not want to hire Sally. This can also be done in a similar manner for the like tag button 711. In some embodiments, the participant and/or leader may only be able to see that there is a dislike, but not be allowed to click on the dislike tag button 712 to display the particular participant that disliked the item.

The context frame 710 can be displayed to a participant in various ways. For example, a context frame button (not shown) could be by each item that allows the participant to bring up the context frame 710 for each item. Alternatively, there can be a context frame icon in the tag tray 720 that allows a participant to select an item by dragging the context frame icon onto an item to display the context frame for that item. In one embodiment, the participant can drag the context frame 710 to different items in the participant window 700 to display the context information associated with the item.

The process of liking and disliking an item can be repeated by the same participant. For example, if Jack Hammer initially liked the item "Should we hire Sally" and then later on in the discussion decided that he no longer liked hiring Sally, Jack Hammer could dislike the item "Should we hire Sally." This would decrement the like count under the like tag button 711 by one and increment the count under the dislike tag button 712.

In another embodiment, the icons in the tag tray 720 and the button on the context frame can change based on the item that is selected. For example, a different set of icons in the tag tray 720 and a different set of buttons on the context frame 720 may be displayed when the context frame is over the item "Yes, she is good." In one embodiment, the icons in the tag tray 720 and/or context frame can be enabled or disabled based on the selected item.

Leaders can also create other tags that can be applied to any item/contribution. For example, tags could be created to feature items, include items in a report, identify items as belonging to a particular classification etc.

In one embodiment, only the leader will have access to the tag tray 720. The leader can use the tag tray 720 to determine which buttons 711-714 will be displayed in the context frame 710 to the participants. The leader can drag-in-drop one of the icons 721-728 onto the context frame 710 to add a button (e.g. one of the buttons 711-714) to the context frame 710 that is displayed to the participants. The individual participants can then select the button 711-714 and perform a drag-in-drop onto the item (e.g. item 710) to tag the item. For example, the leader could do a drag-in-drop of the like icon 721 onto the context frame 710 to add the like button 711 to the context frame 710 that is displayed to the participants. A participant could indicate that she likes the "Should We Hire Sally" item by dragging-in-dropping the like button 711 onto the item "Should We Hire Sally."

The leader can also remove a button 711-714 from the context frame 710. This is accomplished by the leader dragging-and-dropping one or more of the buttons 711-174 onto the tag tray 720.

FIG. 8 is a first diagram of a first view of a leader window 800 for controlling a collaboration framework that includes a stepping framework. The leader window 800 is similar to the leader window 200 with the addition of a step frame 801. The step frame 801 comprises step buttons 810A-810N. The step frame 801 is used to step a leader through a defined series of steps in an interactive collaboration session by allowing the leader to click on each step button 810A-810N to advance to the next step in the interactive collaboration session.

A typical interactive collaboration session will include a series of steps or patterns. For example, the leader may want to discuss the category "sales" first in an interactive collaboration session with the participants. Next the leader may want to discuss the "marketing" category. In each step, the leader may only want the participants to view specific information in the interactive collaboration session. For example, when the leader wants to discuss the "sales" category, the leader may want to only display the ideas column 220 (controlled by the ideas control button 221) and the comments column 230 (controlled by the comment control button 231). In addition, the leader may only want to allow the addition of comments into the comment column (controlled by the add comment control button 233). For the "marketing" step, the leader may only want to display the comments column 230 without allowing any comments by the participants. Normally the leader would have to manually select each of the buttons 206, 207, 211, 213, 221, 223, 231, 233, 241, and 251 to provide the desired display in the participant window 200 for each step in the interactive collaboration session. The step frame 801 allows the leader to step through the interactive collaboration session by selecting the step buttons 810A-810N to provide the desired view (by automatically selecting the buttons 206, 207, 211, 213, 221, 223, 231, 233, 241, and 251 defined for that step) to the participants in the interactive collaboration session. This way, the leader does not have to worry about what is being displayed to the participants in each step of the interactive collaboration session.

The steps of an interactive collaboration session can be defined by the leader or an administrator prior to the beginning of the interactive collaboration session in the template 124. The template 124 can be generated in various ways. For example, the leader or administrator can set a particular set of buttons 206, 207, 211, 213, 221, 223, 231, 233, 241, and 251 to a particular configuration and then save it off as a step. This process can be repeated for each of the steps of the interactive collaboration session. Alternatively, the steps can be programmed by a leader defining the settings of the buttons 206, 207, 211, 213, 221, 223, 231, 233, 241, and 251 for each step in the template 124.

The template 124 is then loaded as part of the interactive collaboration session. The loading of the template 124 causes the step frame 801 to be displayed in the leader window 800. In this example, the template 124 has N steps. Each of the steps are represented by one of the step buttons 810A-810N. The leader can go to a specific step by clicking on the specific step button 810 for the step that the leader wants displayed to the participants of the interactive collaboration session. In this example, there is a specific step button 810 associated with each step in the interactive collaboration session. However, in other embodiments, a previous and next buttons could be used in place of the step buttons or a combination of step buttons 810 and next and previous buttons can be used.

Figure 9:
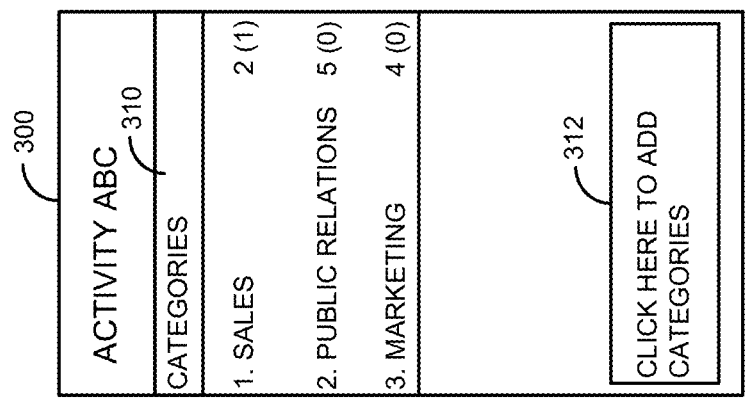
FIG. 9 is a diagram of a first view of a participant window of a controlled view in a collaboration framework that uses a stepped activity framework.

In the FIG. 8 the leader has selected step button 810B (as indicated by the grey background of step button 810B) to display the configuration associated with step 2 of the interactive collaboration session. For step 2, the template 124 defines that only the categories column 210 will be displayed along with allowing the participants to add to the categories. This results in the leader window 800 being displayed to the leader that only has the category control button 211 and the add categories control button 213 set to green (black in FIG. 8). A corresponding participant window 300 is displayed to the participants of the interactive collaboration session as shown in FIG. 9. The participant window 300 in FIG. 9 only shows the categories column 310 along with the participant add categories box 312. When the leader selects another step button 810, the configuration associated with the selected step is then used to display the defined view for the leader and the participants.

When the leader selects each of the step buttons, a context associated with the step button 810 is displayed. In this example, the context for step 2 is for a "review of categories" for activity ABC as shown near the top of the leader window 800. Information that describes the step can be displayed in different areas in leader window 800. For example, this information could be displayed on the step buttons 810 or be displayed via a popup window when a cursor is positioned above one of the step buttons 810.

During a particular step, the leader may still manually select one or more of the buttons 206, 207, 211, 213, 221, 223, 231, 233, 241, and 251 to dynamically change the view in the participant window 300 during the interactive collaboration session. This gives the leader the ability to easily control the interactive collaboration session.

Figure 10:
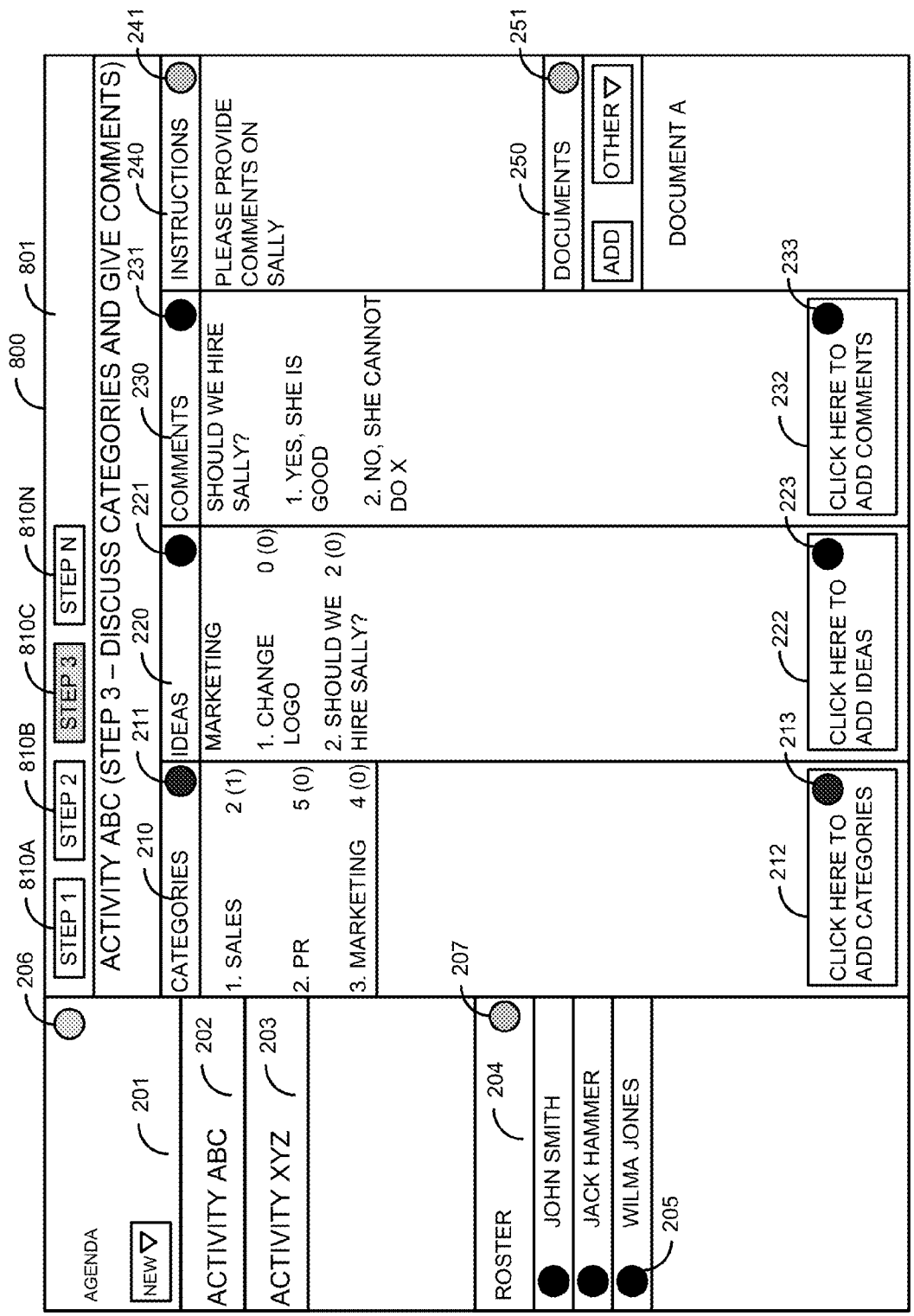
FIG. 10 is a second diagram of a second view of a leader window for controlling a collaboration framework that includes a stepped activity framework.

FIG. 10 is a second diagram of a second view of a leader window 800 for controlling a collaboration framework that includes a stepping framework. In FIG. 8, the leader, after selecting step 2 as described in FIG. 8, selects the step button 810C (as indicated by the grey background of step button 810C) for step 3 of the interactive collaboration session. Information for step 3 of the interactive collaboration session in the template 124 is used to create the display as shown in FIG. 10. When the leader selects the step button 810C for step 3 in the interactive collaboration session, the buttons 221, 223, 231, and 233 are toggled from grey to green (black in the drawings) based on the template 124 to indicate that the participants of the interactive collaboration session can now view and enter information in the ideas column 220 and the comments column 230. This also results in the display of a corresponding participant window 300 that is displayed to the participants of the interactive collaboration session as shown in FIG. 11. For this step of the interactive collaboration session, the participants can now add ideas and comments.

In FIG. 10, when the activity for step 3 also changes to "discuss categories and give comments" in the leader window 900. This gives the leader the context of this step (step 3). The leader then repeats this process through step N, which completes the interactive collaboration session.

Figure 12:
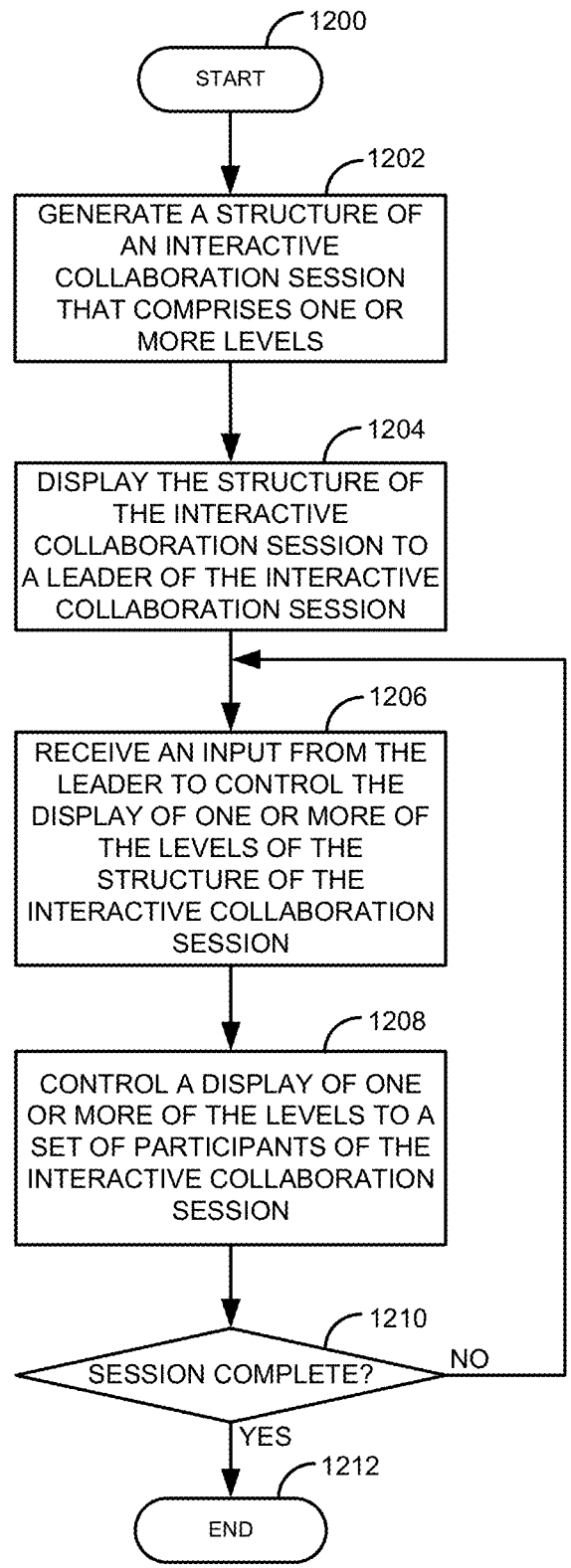
FIG. 12 is flow diagram of a method for controlling a display of a collaboration framework.

FIG. 12 is flow diagram of a method for controlling a display of a collaboration framework. The process starts in step 1200. The process generates, in step 1202, a structure of an interactive collaboration session that comprises one or more levels. The structure of the interactive collaboration session can be generated based on a template that is defined by the leader of the interactive collaboration session.

The structure of the interactive collaboration session is displayed to a leader of the interactive collaboration session in step 1204 (e.g., as shown FIGS. 2, 4, 6, 8, and 10). Input is received from the leader to control the display of one or more levels of the structure of the interactive collaboration session in step 1206 (e.g., by the leader clicking on one of the buttons 206, 207, 211, 213, 221, 223, 231, 233, 241, and 251 as described previously).

In response to the input from the leader in step 1206, a display of one or more of the levels that is displayed to a set of participants of the interactive collaboration session is controlled in step 1208. For example, when the leader of the interactive collaboration session clicks on the category control button 211, the participant categories column 310 is removed from the participant window 300. The process determines in step 1210 if the interactive collaboration session is complete. If the interactive collaboration session is not complete in step 1210, the process goes to step 1206 to receive additional input from the leader. Otherwise, if the interactive collaboration session is complete in step 1210, the process ends in step 1212.

Figure 13:
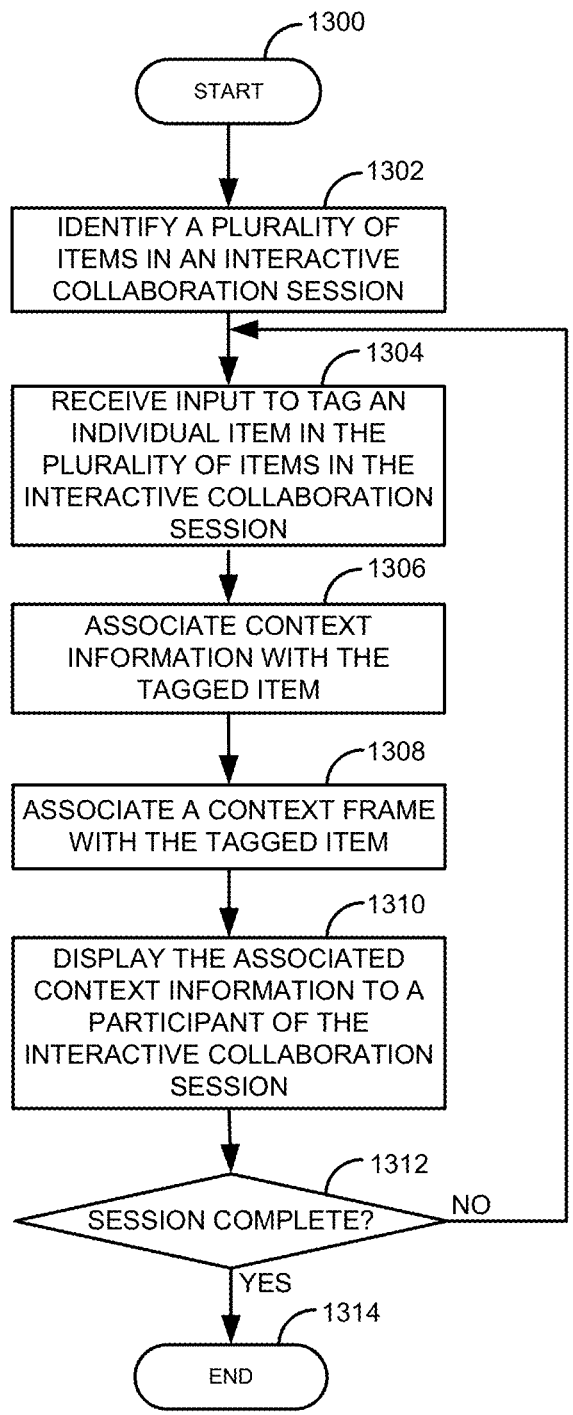
FIG. 13 is a flow diagram of a method for managing context information in an interactive collaboration session.

FIG. 13 is a flow diagram of a method for managing context information in an interactive collaboration session. The process starts in step 1300. The process identifies a plurality of items in an interactive collaboration session in step 1302. An item can be identified from a profile. An item can be an item associated with a level in the structure of the interactive collaboration session. For example, an item can be an item in the leader categories column 210 and/or the participant categories column 310 such as "sales", "PR", and "marketing. An item can be an item in the columns 201, 204, 220, 230, 240, 250, 320, 330, 340, 350 and/or the like. The item could be the column itself. The item may be text object, a graphical object, a button, an icon, a menu item, a tab, a menu bar, a row, a combination of these, and the like.

Input to tag an individual item is received during the interactive collaboration session in step 1304. For example, a participant of the interactive collaboration session can like the "Yes she is good" item using the tag tray 720 in the participant comments column 310 of the participant window 300. The context information is associated with the tagged item (e.g., the like that is associated with the tagged item "Yes she is good") in step 1306. A context frame 710 is associated with the tagged item in step 1308.

In response to step 1304, the associated context information (e.g., the like) is displayed to a participant (e.g., via a number that displays the total number of likes for the item) of the interactive collaboration session in step 1310. For example, information can be generated in a web page that is sent to a communication for display at a communication device. The process determines in step 1312 if the interactive collaboration session is complete in step 1312. If the interactive collaboration session is not complete in step 1312, the process goes to step 1304 to get more tagged items. Otherwise, if the interactive collaboration session is complete in step 1312, the process ends in step 1314.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for collaboration comprising:

generating a structure of an interactive collaboration session, wherein the structure of the interactive collaboration session comprises a plurality of levels, wherein the interactive collaboration session is displayed in a hierarchical column-based structure, and wherein the plurality of levels visually indicates a column-based hierarchy within a structure of an agenda for the interactive collaboration session;

generating, for display, the structure of the interactive collaboration session to a leader of the interactive collaboration session;

receiving an input from the leader to control the display of the plurality of levels of the structure of the interactive collaboration session;

in response to receiving the input to control the display of the plurality of levels of the structure of the interactive collaboration session, controlling the display of the plurality of levels to a set of participants of the interactive collaboration session;

generating, for display, a plurality of steps of the interactive collaboration session from a predefined template, wherein selection of individual ones of the plurality of steps of the interactive collaboration session cause a display of the plurality of levels shown to the set of participants to change and wherein the change causes a display of individual levels of the plurality of levels to change differently for individual participants of the set of participants;

dividing the structure of the interactive collaboration session into a plurality of structures of the interactive collaboration session, wherein the plurality of structures of the interactive collaboration session are based on a plurality of activities; and providing a mechanism for displaying individual ones of the plurality of structures of the interactive collaboration session to the leader of the interactive collaboration session, wherein the set of participants are divided among the plurality of the structures of the interactive collaboration session into a plurality of sets of participants and wherein one of the plurality of sets of participants is unable to view another set of participant's respective structure of the interactive collaboration session, and wherein at least one participant of the set of participants can toggle back and forth between the plurality of structures of the interactive collaboration session.

2. The method of claim 1, wherein a view that is displayed to the set of participants comprises not showing the one or more of the plurality of levels to the set of participants, and wherein the structure of the interactive collaboration session that is displayed to the leader does show the plurality of levels.

3. The method of claim 1, wherein a view that is displayed to an individual one of the set of participants comprises only showing input from the individual one of the set of participants.

4. The method of claim 1, wherein controlling the display of the plurality of levels to the set of participants further comprises controlling a display of content associated with the plurality of levels.

5. The method of claim 1, further comprising receiving an input from the leader of the interactive collaboration session to control information that can be entered by individual ones of the set of participants in one or more of the plurality of levels.

6. The method of claim 1, wherein the leader of the interactive collaboration session can search the structure of the interactive collaboration session to create a new category or a new idea based on results of the search.

7. The method of claim 1, further comprising reading in the predefined template to generate the structure of the interactive collaboration session, and wherein the structure of the interactive collaboration session is at least one of:
   a hierarchical structure;
   a tabbed structure;
   a grid structure; and
   a menu structure.

8. A system for collaboration comprising:
   a collaboration module comprising a processor and memory that generates a structure of an interactive collaboration session, wherein the structure of the interactive collaboration session comprises a plurality of levels, wherein the interactive collaboration session is displayed in a hierarchical column-based structure, and wherein the plurality of levels visually indicate a column-based hierarchy within a structure of an agenda for the interactive collaboration session, receives an input to control a display of the plurality of levels of the structure of the interactive collaboration session, and divides the structure of the interactive collaboration session into a plurality of structures of the interactive collaboration session, wherein the plurality of structures of the interactive collaboration session are based on a plurality of activities; and
   a display module that generates information to display the structure of the interactive collaboration session to a leader of the interactive collaboration session, controls the display of the plurality of levels to a set of participants of the interactive collaboration session in response to receiving the input to control the display of the plurality of levels of the structure of the interactive collaboration session, generates, for display, a plurality of steps of the interactive collaboration session from a predefined template, wherein selection of individual ones of the plurality of steps of the interactive collaboration session cause the display of the plurality of levels shown to the set of participants to change, wherein the change causes a display of individual levels of the plurality of levels to change differently for individual participants of the set of participants, provides a mechanism for displaying individual ones of the plurality of structures of the interactive collaboration session to the leader of the interactive collaboration session, wherein the set of participants are divided among the plurality of the structures of the interactive collaboration session into a plurality of sets of participants and wherein one of the plurality of sets of participants is unable to view another set of participant's respective structure of the interactive collaboration session and wherein at least one participant of the set of participants can toggle back and forth between the plurality of structures of the interactive collaboration session.

9. The system of claim 8, wherein a view that is displayed to the set if participants comprises not showing the one or more of the plurality of levels to the set of participants and wherein the structure of the interactive collaboration session that is displayed to the leader does show the plurality of levels.

10. The system of claim 8, wherein controlling the display of the plurality of levels to the set of participants further comprises controlling a display of the content associated with the plurality of levels.

11. The system of claim 8, wherein the collaboration module receives an input from the leader of the interactive collaboration session to control information that can be entered by individual ones of the set of participants in one or more of the plurality of levels.

12. The method of claim 1, further comprising: receiving input from the leader of the interactive collaboration session, that can take an individual participant in and out of an activity based on a specific topic being discussed.

13. The method of claim 1, further comprising: receiving input from the leader of the interactive collaboration session that limits an individual participant of the set of participants to only view a contribution/input contributed by the individual participant of the set of participants and not view a contribution/input contributed by other individual participant of the set of participants.

14. The method of claim 1, wherein a user defines the plurality of steps of the interactive collaboration session prior to the interactive collaboration session and wherein each of the plurality of steps are defined by the user selecting a particular set of buttons that define the plurality of levels for each participant in the set of participants.

* * * * *